April 28, 1970   R. J. BLAND   3,509,448
POWER SUPPLY VOLTAGE REGULATOR HAVING POWER SHARING
REGULATING TRANSISTORS AND CURRENT LIMITING MEANS
Filed June 3, 1968

INVENTOR
ROBERT J. BLAND
BY
AGENT

United States Patent Office 3,509,448
Patented Apr. 28, 1970

3,509,448
POWER SUPPLY VOLTAGE REGULATOR HAVING POWER SHARING REGULATING TRANSISTORS AND CURRENT LIMITING MEANS
Robert J. Bland, Berkeley Heights, N.J., assignor to Hewlett-Packard Company, Palo Alto, Calif., a corporation of California
Filed June 3, 1968, Ser. No. 733,858
Int. Cl. G05f 1/58
U.S. Cl. 323—9  3 Claims

ABSTRACT OF THE DISCLOSURE

A circuit includes two shunt connected, power sharing, voltage regulating transistors which are sequentially controlled by circuitry including a constant current source and three current sinks. One of the current sinks is responsive to the load voltage. The second current sink is controllable to limit load current at normal regulated load voltages, and to cut back load current when the load resistance drops below a predetermined value. The third current sink drives the two regulating transistors in response to the current which is not diverted by the other two current sinks.

BACKGROUND OF THE INVENTION

A voltage regulator having a single regulating element such as a power transistor is limited in application by its power rating and control sensitivity. The power handling capability of a voltage regulator may satisfactorily be increased by using more than one regulating transistor; however the required control circuitry is often very complex and inadequate to provide accurate voltage regulation. The control circuit configuration and operation becomes even more complex and susceptible to malfunctioning when protective features, such as current limiting means, are provided. Preferably the current limiting means should be designed to perform the dual function of safeguarding both the regulating transistors and the load against excessive currents when the load resistance suddenly decreases.

SUMMARY OF THE INVENTION

The present invention in one specific embodiment includes two shunt connected, power sharing, regulating transistors provided between a source of unregulated D.C. voltage and a load. The two transistors are controlled sequentially to provide voltage regulation at low and high load currents, respectively. The control circuitry includes a constant current source and three current sinks, one of which drives the regulating transistors and the other two of which are responsive to load voltage and current, respectively. The sink responsive to load current is controllable in a first mode of operation to limit load current to a predetermined maximum value at regulated load voltages within a certain range, and in a second mode of operation to decrease the load current in proportion to the load resistance when the load voltage drops below its minimum regulated value.

DESCRIPTION OF THE PREFERRED EMBODIMENT

Figure 1:
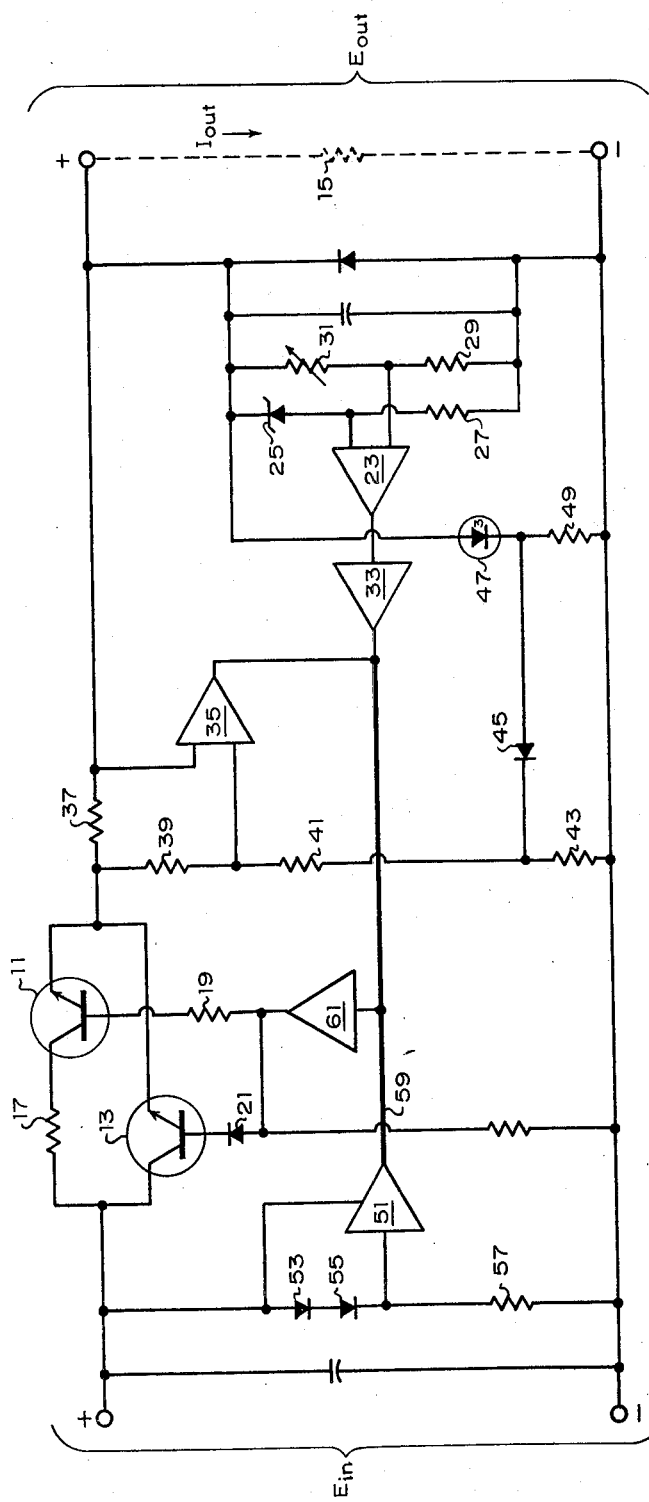
FIGURE 1 is a combined schematic and block diagram of the preferred embodiment of the voltage regulator of the present invention.

Referring now to FIGURE 1, the illustrated voltage regulating circuit has a pair of input terminals for receiving an unregulated D.C. voltage $E_{IN}$ provided by a conventional power supply including a transformer and bridge rectifier, not shown. The input voltage $E_{IN}$ is regulated by two transistors 11, 13 and applied through a pair of output terminals to a load 15 to maintain the output voltage $E_{OUT}$ constant.

The emitter-collector current path of transistor 11 is connected in series with a resistor 17, and the emitter-collector current path of transistor 13 is connected in parallel with the series combination of transistor 11 and resistor 17. Feedback control circuitry, hereinafter described, drives the bases of transistors 11 and 13 through a biasing resistor 19 and diode 21, respectively, so that these transistors are controlled sequentially. Specifically, at low load currents, transistor 13 is cut off and transistor 11 regulates the output voltage, and at high load currents, transistor 11 saturates and transistor 13 regulates the output voltage. The purpose of resistor 17 is to limit the power consumed by transistor 11 when it is partially conducting and to provide a voltage drop which transistor 13 can adjust.

The feedback control circuitry for the two regulating transistors 11, 13 includes an amplifier 23 which compares a fixed reference voltage with a portion of the output voltage to the load and produces a difference or error signal output. The reference voltage is provided by a Zener diode 25 and a resistor 27 connected in series across the load terminals. A portion of the output voltage is fed to the comparison amplifier 23 by a voltage divider formed by resistors 29 and 31, the latter of which is variable to adjust the error signal output, which in turn maintains the regulator output voltage at a desired value within a predetermined range. The comparison amplifier drives an intermediate amplifier or gatable current sink 33, hereinafter described, which conducts current in proportion to the magnitude of the error signal.

The feedback control circuitry for the regulating transistors 11, 13 also includes an output current limiting amplifier or gated current sink 35 which senses the voltage developed across a current sensing resistor 37 connected in series with the main current path to the load and having a low valve on the order of .1 ohm. The control input of current sink 35 is appropriately biased by a voltage divider including three resistors 39, 41, 43 connected in series with sensing resistor 37 across the load teminals. A clamping diode 45 has its cathode connected to the common junction of resistors 41, 43 and its anode coupled to the positive load terminal through a three-junction biasing diode 47, the latter of which is maintained conducting by a resistor 49 connected to the negative load terminal. Clamping diode 45 is poled to conduct whenever the output voltage is at least 100% of its rated value and the current to the load 15 exceeds a predetermined value, as hereinafter described.

There is provided a constant current source formed by an amplifier 51 which is driven by the constant voltage developed across a pair of diodes 53, 55 connected in series with a resistor 57 across the regulator input terminals. Amplifier 51 supplies a constant current to a common line 59. Connected to the line 59 are two current sinks 33, 35 for diverting current from the constant current source in accordance with their respective gate control signals. A third current sink or non-inverting amplifier 61 has a control input connected to the common line 59 and an output connected to the common junction of resistor 19 and diode 21. Current sink 61 drives regulating transistors 11, 13 in response to the magnitude of the remaining current from source 51 that is not diverted by current sinks 33, 35. At low output load currents, the drive signal from current sink 61 is insufficient to forward bias diode 21, so transistor 13 is cut off and transistor 11 is turned on. At higher output currents to the load, the drive signal is large enough to saturate transistor 11 and forward bias diode 21 thereby rendering transistor 13 partially conducting to regulate the output voltage $E_{OUT}$.

Figure 2:
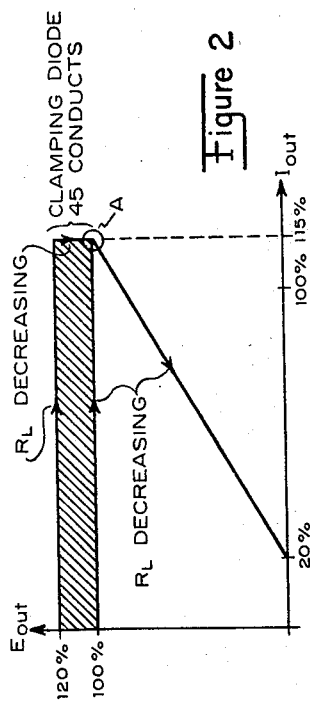
FIGURE 2 is a graph of output voltage versus output current illustrating the current limiting and cutback features of the voltage regulator of the present invention.

Operation of the load current limiting circuitry may best be understood with reference to graph of FIGURE 2, which illustrates the relationship of output voltage $E_{OUT}$ and output current $I_{OUT}$ as the load resistance decreases in the direction shown by the arrows. The output voltage $E_{OUT}$ may be set by variable resistor 31 to any value within a predetermined range, for example 100% to 120% of the voltage rating of the regulator, as shown by the shaded portion of the graph. Within this voltage range, load voltage is constant, clamping diode 45 is conducting to maintain the voltage at the junction of resistors 41, 43 constant, and the current limiting sink 35 is biased into non-conduction. However, if load current increases to a predetermined maximum value, for example 115% of the rated output current, then current sink 35 will conduct in response to the signal received from sensing resistor 37. This in turn diverts more current from driver sink 61, thereby decreasing the conduction of regulating transistors 11, 13 and limiting load current.

When the load resistance decreases below the point A where maximum permissible load current is supplied at the minimum regulated voltage, the output to the load loses regulation, clamping diode 45 becomes reverse biased, and current sink 25 is biased into increased conduction by the gating signal produced by the combination of voltage divider resistors 39, 41, 43. As a result, transistors 11, 13 receive less drive signal and decrease conduction to cut back the load current in linear relation to the load resistance, as shown in FIGURE 2. When the output is short circuited, output current is limited to about 20% of its full rated value.

From the foregoing description, it can be seen that current sink 35 is operable in two different modes. Specifically, in one mode of operation, current sink 35 is gated in response to load voltage to cut back load current. In the other mode of operation, current sink 35 is gated in response to load current to limit load current as long as the output voltage is above its minimum regulated value.

I claim:

1. A voltage regulator connected between a source of unregulated D.C. voltage and a load terminal, said voltage regulator comprising:
    main regulator circuit means connected in a series current path between said unregulated source and said load terminal, said main regulator circuit means including:
        first transistor means for regulating load voltage at low load currents, below a selected value;
        a power sharing resistor connected in series with said first transistor means; and
        second transistor means shunting the series connection of said first transistor means and said power sharing resistor for regulating load voltage at high load currents above a selected value;
    a source of reference voltage;
    means connected to said load terminal for comparing the load voltage with said reference voltage and for producing an error signal output;
    means providing a source of constant current;
    first, second and third current sink means connected to said constant current source for gating current therefrom;
        said first current sink means having a gate control input responsive to the error signal output of said comparing means;
        said second current sink means including gate control input means responsive in one mode of operation to the voltage across said load and in another mode of operation to the current through said load; and
        said third current sink means having output means for sequentially controlling said first and second regulating transistor means in response to current from said constant current source which is not diverted by said first and second current sink means.

2. The circuit of claim 1, said gate control input means of said second current sink means including voltage divider means for gating said second current sink means in said one mode of operation proportionately to said load voltage when both the resistance of said load and the voltage across said load are less than predetermined values, whereby load current is cut back proportionately to decreasing load resistance.

3. The voltage regulator circuit of claim 2, said gate control input means of said second current sink means further including:
    a load current sensing resistor connected to said voltage divider means; and
    clamping diode means interconnecting said voltage divider means and said load terminal for gating said second current sink in said other mode of operation proportionately to said load current when said load voltage is above a predetermined value.

References Cited

UNITED STATES PATENTS

| 3,040,235 | 6/1962 | Schemel et al. | 323—9 X |
| 3,376,478 | 4/1968 | Sheng et al. | |
| 3,441,833 | 4/1969 | Bahrs et al. | 323—9 |

LEE T. HIX, Primary Examiner

A. D. PELLINEN, Assistant Examiner

U.S. Cl. X.R.

323—22, 25, 38